United States Patent
Cordaillat et al.

(10) Patent No.: US 6,250,356 B1
(45) Date of Patent: Jun. 26, 2001

(54) ASSEMBLY DRUM AND METHOD FOR THE MANUFACTURE OF TIRES

(75) Inventors: Dominique Cordaillat, Billom; Olivier Muhlhoff, Clermont-Ferrand; Bruno Panighel, Aulnat, all of (FR)

(73) Assignee: Compagnie Générale des Etablissements Michelin - Michelin & Cie., Clermont-Ferrend Cedex (FR)

( * ) Notice: Subject to any disclaimer, the term of this patent is extended or adjusted under 35 U.S.C. 154(b) by 0 days.

(21) Appl. No.: 09/299,128

(22) Filed: Apr. 26, 1999

Related U.S. Application Data
(60) Provisional application No. 60/097,293, filed on Aug. 20, 1998.

(30) Foreign Application Priority Data

Apr. 28, 1998 (FR) .................................... 98 05698

(51) Int. Cl.[7] .......................... B29D 30/24; B29D 30/32
(52) U.S. Cl. ........................ 156/400; 152/DIG. 6; 156/132; 156/135; 156/414; 156/417
(58) Field of Search ........................ 156/131–133, 156/135, 123, 398, 400–403, 414–420; 152/539, 454, DIG. 6

(56) References Cited

U.S. PATENT DOCUMENTS

| | | | | |
|---|---|---|---|---|
| 2,045,545 | * | 6/1936 | Shook | 156/133 |
| 2,440,662 | * | 4/1948 | Frazier | 156/401 |
| 5,301,728 | * | 4/1994 | Brown, Jr. et al. | 152/454 |
| 6,030,479 | * | 2/2000 | Ringhoff et al. | 156/133 |

FOREIGN PATENT DOCUMENTS

| | | |
|---|---|---|
| 1198054 | 8/1965 | (DE) . |
| 0481805 | 4/1992 | (EP) . |

OTHER PUBLICATIONS

Patent Abstracts of Japan, vol. 98, No. 12, JP 10180901 A (Yokohama Rubber) Jul. 7, 1998.

* cited by examiner

Primary Examiner—Geoffrey L. Knable
(74) Attorney, Agent, or Firm—Baker Botts L.L.P.

(57) ABSTRACT

The invention concerns a radially expansible assembly drum for the manufacture of tires, having a body mounted on a center shaft and presenting a receiving surface for the products to be assembled, the ends of which have different diameters; the drum contains retractable means capable of covering the end of the receiving surface of smaller diameter, and means of expansion of the drum to two different expanded positions.

7 Claims, 6 Drawing Sheets

ASSEMBLY DRUM AND METHOD FOR THE MANUFACTURE OF TIRES

This application claims the benefit of provisional application Ser. No. 60/097,293 filed Aug. 20, 1998.

BACKGROUND OF INVENTION

The present invention concerns a method of manufacture of tires and a radially expansible assembly drum making it possible to use the method.

The invention concerns, in particular, the manufacture of a tire including a carcass reinforcement and at least one reinforcing bead wire in each of the beads of the tire, inside which the carcass reinforcement forms a turn-up and the two beads of which have different diameters.

The building of this type of tire requires the use of an assembly drum that itself presents sites for receiving beads of different diameters. However, this requirement for accommodating different diameters presents production problems and difficulties in controlling the quality and reliability of the tires produced.

It is important, for the quality and reliability of the tire, to place the components of the carcass reinforcement, such as plies, etc., on the drum evenly in terms of geometry, and therefore centering and imparting tension in the products. This seems particularly difficult on a drum in which the diameters of the bead receiving sites are different. However, it is possible to overcome these difficulties by placing the different products slowly and carefully by hand. It is clear that this solution is not adaptable to the industrial context.

Furthermore, construction of the turn-up of the carcass reinforcement in the beads of the tire necessitates stretching of the carcass reinforcement at the points around which the carcass reinforcement rotates, which is difficult to accomplish simultaneously at two sites of different diameters.

The invention is directed to overcoming these problems.

SUMMARY OF THE INVENTION

According to the invention, the assembly drum, having a body mounted on a center shaft and presenting a receiving surface for the products to be assembled, the ends of which have different diameters, contains retractable means capable of covering the end of the receiving surface of smaller diameter, and means of expansion of the drum to two separate expanded positions.

The retractable means make it possible to create, when that is desired, a generally cylindrical overall surface for receiving the products and the expansion means ensure, due to the two expansion positions of the drum, the possibility of stretching the products on each of the sites of different diameters.

The invention also concerns a method of manufacture of a tire, which includes the following steps:
  using a first surface having ends of different diameters;
  moving toward said first surface a second surface of roughly identical diameter at the end of greater diameter of the first surface in order to cover the end of smaller diameter of the first surface and create a generally cylindrical overall receiving surface;
  depositing a carcass reinforcement on said overall surface;
  depositing a metal or rubber ring-shaped element respectively on each of the ends of the carcass reinforcement;
  retracting the second surface and expanding the first surface;
  turning up each end of the carcass reinforcement respectively around the corresponding ring-shaped element.

Expansion of the first surface is advantageously greater than or equal to the difference in diameter existing between the two ends of said first surface.

DESCRIPTION OF THE DRAWINGS

Other characteristics and advantages of the invention will be shown on reading a description of an embodiment of the invention, with reference to the attached drawings, wherein.

DESCRIPTION OF PREFERRED EMBODIMENTS

Figure 1:
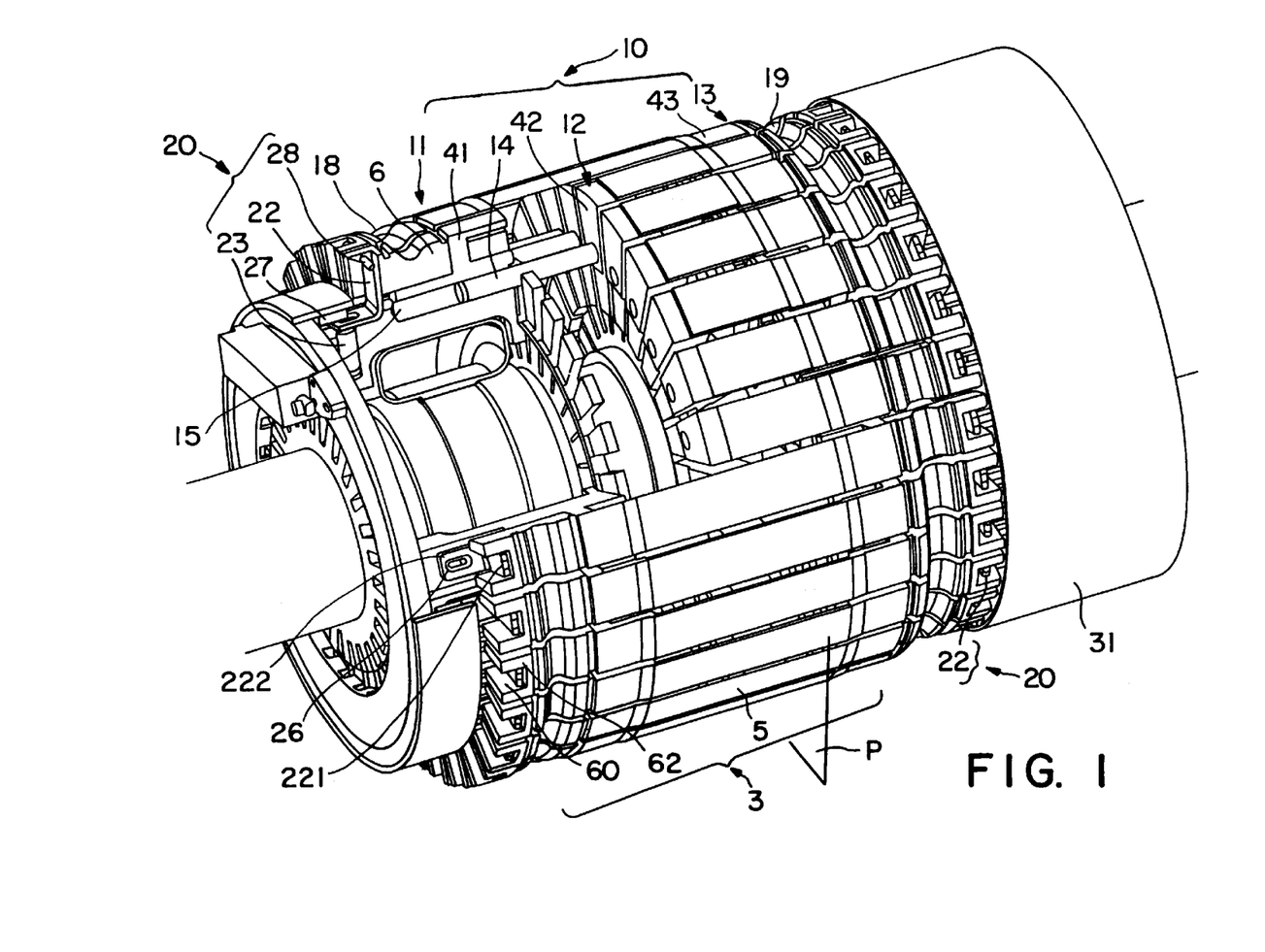
FIG. 1 is a perspective representation partially in section of a drum according to the invention.

According to FIG. 1, the radially expansible assembly drum 1 comprises a body 10 mounted on a center shaft 2 and presenting a surface 3 for receiving the products to be assembled.

The body 10 comprises two semicylinders 11 and 13 axially displaceable on the center shaft 2 in order to regulate the spacing of the wires of the tire to be made, the two semicylinders 11 and 13 being separated by a center crown 12 that is axially fixed in relation to the center shaft 2.

Semicylinders 11 and 13 as well as crown 12 consist of a plurality of segments 41, 43 and 42, respectively, juxtaposed circumferentially around the center shaft 2, segments 41, 42 and 43 being aligned. To secure the coordination of the body 10, each of segments 41 and 43 is connected to the opposite segment 42 by means of a rod 14, which crosses segment 42 and the ends of which are mounted sliding respectively in bores 15 in segments 41 and 43.

To enable the drum 1 to reach its expanded position, segments 41, 42, 43 are radially movable under the action of two expansion chambers 17 placed respectively under said segments 41 and 43, those chambers being inflatable. In their radial movement, segments 41 and 43 carry along the segments 42 of the crown 12 by means of rods 14.

Plates 5 are fastened by screws not represented on segments 42 of the crown 12. Those plates 5 cover segments 41 and 43 at least partially, in order to ensure continuity between the crown 12 and semicylinders 11 and 13 for the products to be assembled, regardless of the axial position of the semicylinders. The crown 12 further makes it possible to ensure axial holding of the plates 5 on radial expansion of the drum 1.

Segments 41 and 43 carry at their lateral ends directed outside the drum 1 support elements 6 and 7, respectively, bearing grooves 18 and 19 for receiving the bead wires of the tire. Those receiving grooves 18 and 19 have different diameters, groove 19 having the smallest diameter in this example, which makes possible the building of an asymmetrical tire, that is, the two beads of which have different diameters.

The receiving surface 3 for the products to be assembled thus consists of the group of exterior surfaces of plates 5, zones of segments 41 and 43 not covered by said plates and exterior surfaces of the support elements 6 and 7.

In the course of the specification, the term "finger" is understood to mean a profile of small section.

The drum 1 chosen in the example described here makes possible the building of an asymmetrical tire, in which the turn-up of the carcass reinforcement in each of the beads is arranged between the bead wire and the carcass reinforcement itself.

Thus, the drum 1 carries at each of the ends of the receiving surface 3, consisting respectively of the exterior surfaces of the support elements 6 and 7, a lifting device 20. A single lifting device will be described below, the one situated to the left of plane P on the figures, the second one being identical, but with a smaller diameter, in accordance with that of the groove concerned.

The lifting device 20 contains a plurality of lifting fingers 22 of rectangular section, distributed circularly around the center shaft 2 and extending in radial directions.

These lifting fingers 22 are arranged axially, relative to the center of the drum 1, outside the receiving groove 18 a short distance away from the latter and respectively presenting a bearing surface 221 for the products to be assembled. The fingers 22 are mounted in radial displacement on segments 41 respectively, said fingers 22 being integral with segments 41 in the expansion movement of the drum 1.

Thus, the lifting fingers 22 are radially deployable toward the outside of the drum 1, from a rest position in which the bearing surfaces 221 constitute an extension of the receiving surface 3, to a deployed position in which the bearing surfaces 221 constitute a cylindrical surface coaxial to the center shaft 2, of diameter greater than that of surface 3. Those lifting fingers 22 thus offer the products to be assembled a plurality of bearing surfaces 221 that are discontinuous and distributed circumferentially.

In deployed position, the end zones of the products resting on the bearing surfaces 221 are therefore raised from the center part of said products resting on the receiving surface 3.

The free ends of the lifting fingers 22, that is, radially outside the drum 1, consist advantageously of a roller 28 mounted in free rotation on a pin and thus carrying the bearing surface 221. Said roller 28 makes it possible to avoid creating stresses in the products raised on deployment of the lifting fingers 22, ensuring in that phase a "rolling" contact between the fingers and the products.

Each finger 22 slides inside a channel 60 hollowed out in the corresponding support element 6. More precisely, the free end of each support element 6, situated outside the drum 1 relative to the receiving groove 18, presents a U-section in a plane perpendicular to a radius, the arms of the U-section extending in axial directions. This arrangement makes it possible, at the time of placing the products whose ends will rest on the bearing surfaces 221, the lifting fingers 22 being at rest, to offer said ends a receiving surface extended all around surfaces 221. The ends of those products are then also supported by the U-shaped exterior surfaces 62 of the ends 61 of the support elements 6, which contributes to obtaining a correct positioning of the products on the drum 1.

The radially interior end of each lifting finger 22 on the drum 1 carries an axial extension 222. Each extension 222 is on a drive jack 23 of said finger housed in a bore in the corresponding segment 41.

Radial displacement of the lifting fingers 22 is limited by the stroke of the drive jacks 23, and the axial positioning of said fingers relative to the body 10 is adjustable due to the holes 26 borne by the extensions 222 and making possible the passage of fastening screws on the jacks 23.

In order to secure the return of the lifting fingers 22 to rest position, an elastic return belt 27 surrounds the set of axial extensions 222.

In addition, the drum 1 carries retractable means 30 capable of covering the end of the receiving surface of smaller diameter, that is, the end consisting of support elements 7. The retractable means 30 comprise a collar 31, the diameter of which is substantially identical to that of the exterior surfaces of the plates 5 and which is mounted, translatable relative to the center shaft 2, between a retracted position represented in FIG. 1 and a position covering the support elements 7 represented at the top of FIG. 2 relative to the axial plane C. It is clear that the presence of the collar 31 makes it possible to place products on a generally cylindrical overall surface, therefore respecting the geometry and tension on placing said products; it will be seen below in the specification how the retracted position makes it possible to retain these criteria while having two diameters for the tire beads.

The collar 31 is borne by a support 32 mounted on the center shaft 2. The support 32 contains a first outer ring 33, concentric to the center shaft 2, which covers the collar 31 in the retracted position of the latter, the collar 31 sliding into the groove 33 formed between the first outer ring 33 and a second inner ring 37.

The second ring 37, also concentric to the center shaft 2, is placed at the lateral end of the support 32 directed toward the body 10 and facilitates guidance of the collar 31.

At its lateral end directed opposite the body 10, the support 32 has an annular chamber 38 concentric to the center shaft 2, inside which a piston 381 driving the collar 31 slides axially, being connected to the latter by rods 39. The link of each rod 39 with the collar 31 is made by mounting said rod on a bearing 40 integral with the collar 31 and assuring its translation guidance. The rods 39 can also be moved by means of a motor.

Furthermore, the drum 1 carries means for expansion of the drum 1 to two different expanded positions. Those expansion means comprise, of course, the expansion chambers 17 previously described.

The expansion means also comprise two control crowns 56 and 57 coaxial to the center shaft 2, rotatably mounted on the center shaft 2 axially outside the body of the drum 1 in proximity to each of the ends consisting respectively of segments 6 and 7 of the body 10. A single crown could be used; however, the use of two of them will preferably be chosen in order to ensure good expansion synchronization between the two ends of the drum.

Each of the crowns 56, 57 is, moreover, mounted rotating on support rings mounted on the center shaft 2 and integral with the latter. For reasons of compactness essentially, the support ring corresponding to crown 57 is formed by the second interior ring 37, which carries for that purpose an interior cylindrical shoulder 372 cooperating with crown 57, crown 56 being mounted on a support ring 36 symmetrically bearing a shoulder 362.

Figure 3:
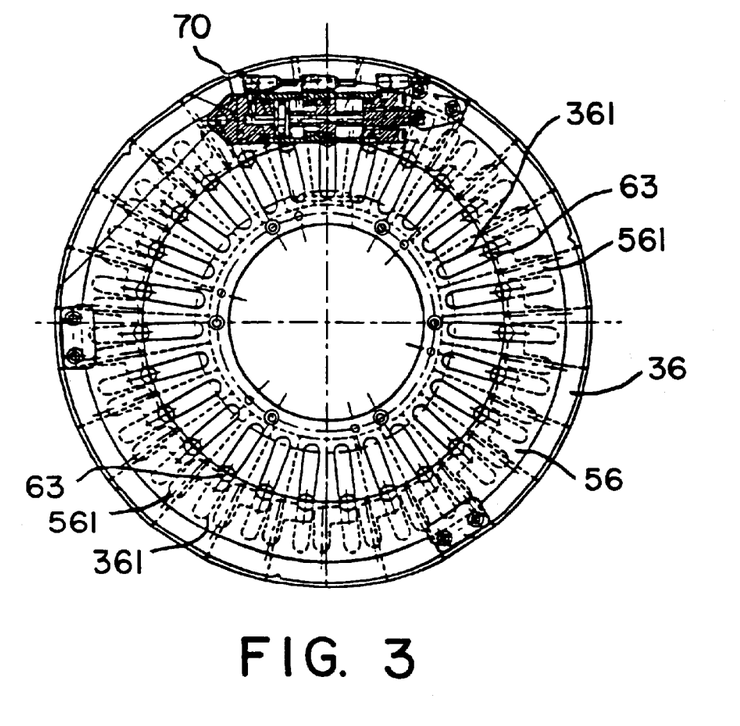
FIG. 3 is a radial section of the drum along line III of FIG. 2.

Each segment 6 (7) has a pawl 63 (73) that engages in a cam 561 (571) carried by the control crown 56 (57) and in a hole 361 (362) oriented in a radial direction and borne by the support ring 36 (37), as shown in FIG. 3.

The expanded position accessible to drum 1 is dependent on the angular position of said crown 56 (57). In fact, depending on the rotation of the crown 56 (57) and, therefore, its angular position and that of the cam 561 (571), the pawls 63 (73) have a different radial positioning range, which therefore limits the radial expansion of the drum 1, the holes 361 (362) ensuring guidance of the pawls 63 (73) and therefore of the segments 41 (43) in radial directions.

Rotation of the crowns 56 and 57 and control of their angular position are managed by jacks. Those jacks being identical, only the jack 70 represented in FIG. 4 will be described, in any position which is not one of the stable positions of said jack.

Figure 4:
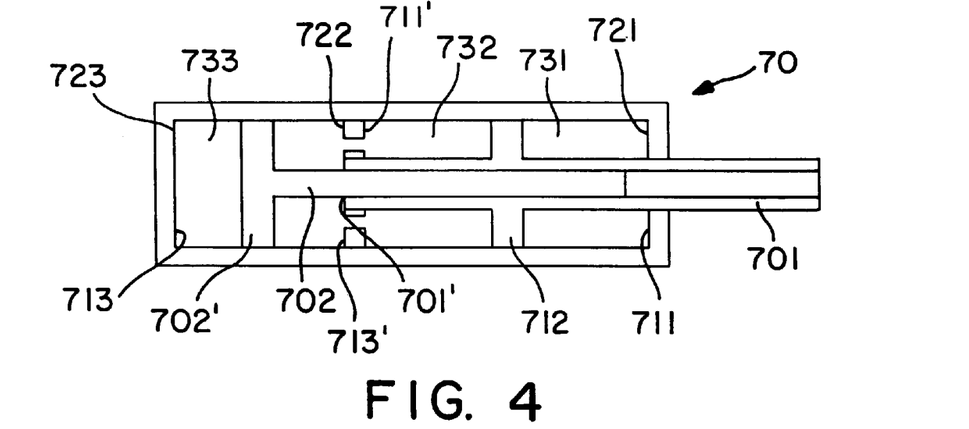
FIG. 4 is a schematic representation of a jack represented in FIG. 3.

Jack 70 contains two chambers delimited by stops 711 and 711' on one side and 713 and 713' on the other. Jack 70 also contains a sliding piston 701 bearing an end stop 701' and a rod 702 sliding inside the piston 701 with an end 702' cooperating with stops 713 and 713'. The piston 701 also bears an intermediate stop 712 cooperating with stop 711; stop 701' cooperates with stop 702'.

The chamber of jack 70 is thus separated into different compartments respectively fed through an air supply hole:
- the compartment 731 defined between fixed stop 711 and intermediate stop 712 is fed through hole 721;
- the compartment 732 defined between intermediate stop 712 and end 702' is fed through hole 722;
- and the compartment 733 defined between end 702' and fixed stop 713 is fed through hole 723.

Figure 5A:
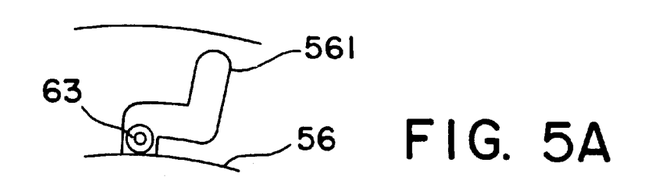
FIGS. 5A to 5F are schematic representations in radial section illustrating the different phases of operation of a cam of a crown of the drum.
Figure 5B:
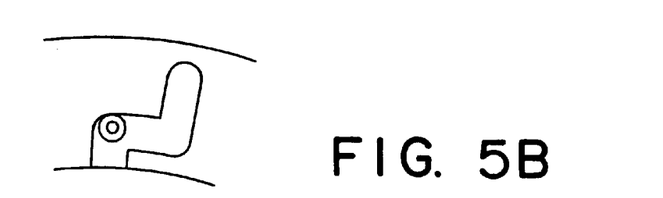

The jack 70 thus has three possible positions corresponding to the three angular positions of the crown 56:
- The return position in which the jack 70 is fed with air through the single hole 721, the end 702' being in contact with the fixed stop 713 and with end stop 701', that position corresponding to the position of the crown 56 represented in FIGS. 5A and 5B;
- The intermediate position in which the jack 70 is fed through holes 721 and 723, end 702' being in contact with the fixed stop 713' and with end stop 701'. The differences in pneumatic pressure in the chambers are such that end 702' remains in contact with the fixed stop 713' when end 701' bears on end 702'. That position corresponds to the position of the crown 56 represented in FIGS. 5C and 5D;
- Finally, the outlet position in which the jack 70 is fed through the single hole 722, end 702' being in contact with fixed stop 713 and stop 712 with fixed stop 711, that position corresponding to the position of the crown 56 represented in FIGS. 5E and 5F.

Figure 2:
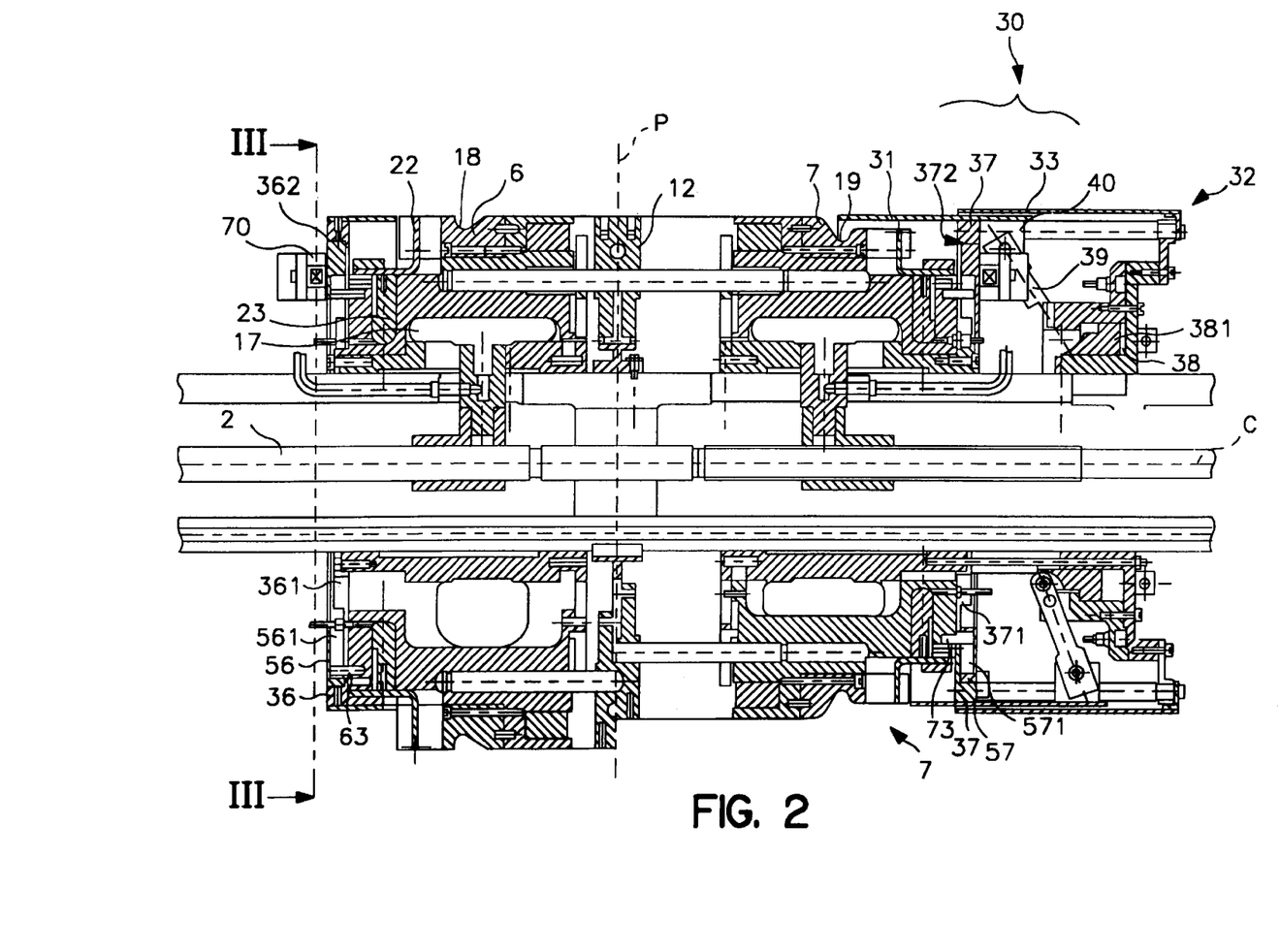
FIG. 2 is an axial section of the drum represented in FIG. 1 in three different configurations: at the top in retracted position of the drum, collar advanced, at the lower right in intermediate position of the drum and at the lower left in expanded position of the drum.
Figure 5C:
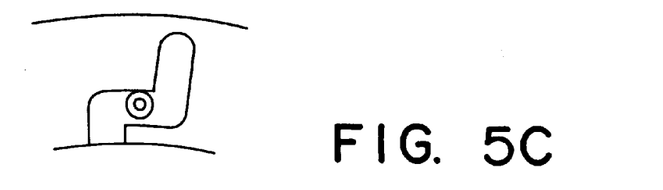
Figure 5D:
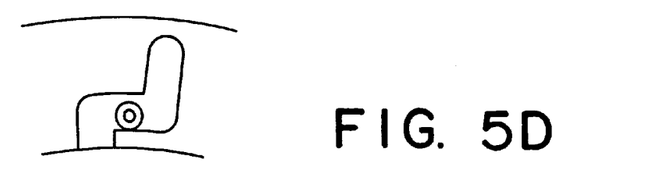
Figure 5E:
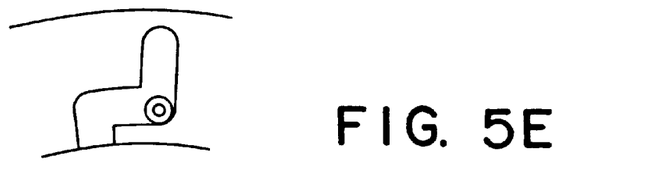
Figure 5F:
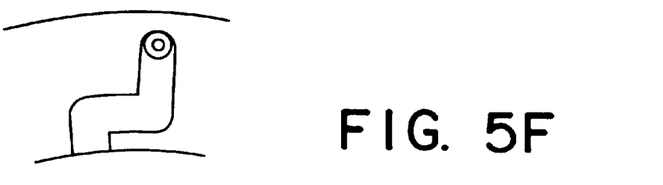

FIGS. 5A to 5F show the shape of cam 561 resembling a Z, the two cams 561 and 571 being identical, and the different possible positions for the pawl 63:
- FIG. 5A corresponds to the retracted position of the drum 1, as it appears at the top of FIG. 2;
- FIGS. 5B, 5C, 5D and 5E correspond to a first expanded position of the drum 1, which will be called "intermediate position," represented in FIG. 2 at the lower right;
- FIG. 5F corresponds to the position of maximum expansion of the drum 1, which will be called "expanded position" and which is represented in FIG. 2 at the lower left.

The circumferential position of the crowns 56 and 57 is controlled by jacks 70 and 71 respectively. A motor-driven operation can also be used.

The method of manufacture of a passenger car tire with radial carcass reinforcement will be described below, with reference to FIGS. 6A to 6H and 5A to 5F, the tire comprising a carcass reinforcement and two beads of different diameters containing at least one reinforcing bead wire and in which the carcass reinforcement forms a turn-up arranged between the bead wire and the carcass reinforcement itself.

The equipment making it possible to use the method comprises, the drum 1 and guide wires 50 displaceable axially and coaxially to the center shaft 2. These guide wires 50 respectively comprise a wire transfer ring having gripping edges distributed over its circumference, ensuring a concentric holding of the wire on the drum 1.

At the start:
- the drum 1 is in retracted position, the expansion chambers 17 being deflated;
- the collar 31 is retracted under the first ring 33;
- the jack 70 (71) is in retracted position;
- the pawls 63 (73) are in the lowest radial position in the cam 58 (59), as shown in FIG. 5A;
- the lifting devices 20 are at rest, the bearing surfaces 221 of the lifting fingers 22 extending the receiving surface 3.

Keeping the other elements of the drum 1 at rest, the collar 31 is translated, guided by bearing 40, which covers the support elements 7 and makes it possible to create a generally cylindrical overall surface for placing products.

A ply of textile cords is then deposited, which alone constitutes in the example described here the carcass reinforcement A on that overall surface.

Two profiles of rubber compound P' and P" are then respectively deposited on the lateral end zones A' and A" of the carcass reinforcement A outside the axial positionings of the receiving grooves 18 and 19. Those profiles P' and P" possess, in the example described, a quadrilateral-shaped section, but it is clear that other section shapes can be used. Furthermore, in order to have sufficiently hard profiles P' and P", a rubber compound with a Mooney ML (1+4) viscosity at 100° C., measured according to standard ASTM:D-1646, greater than or equal to 70 will preferably be chosen.

Figure 6A:
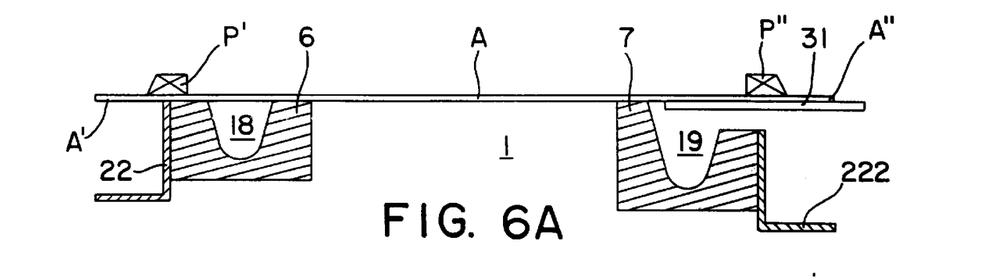
FIGS. 6A to 6H are schematic representations in partial axial section representing the different phases of manufacture of a tire according to the invention.

As FIG. 6A shows, profiles P' and P" are deposited above the bearing surfaces 221 of the lifting fingers 22 of each lifting device 20, in order to permit tilting of said profiles on deployment of the fingers and turn-up of the carcass reinforcement A around points R' and R" constituting a rigidity change point relative to carcass reinforcement A.

Figure 6B:
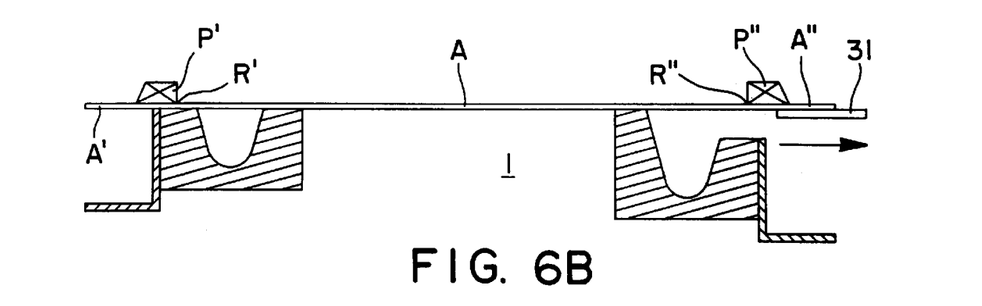

The collar 31 is retracted by driving the rod 39 toward the first ring 33, as represented in FIG. 6B. It should be noted, in passing, that the surface of the collar is chosen and/or treated so that the carcass reinforcement A does not stick to said surface.

Figure 6C:
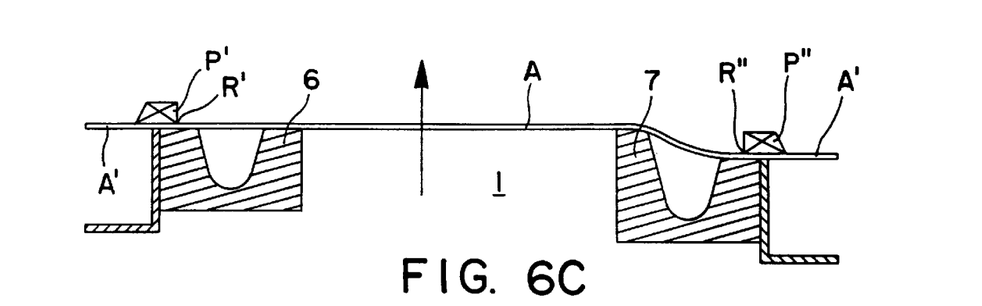

The drum 1 is then passed into intermediate position, as can be seen in FIG. 6C, which enables the support elements 7 to come in contact with end A" of the carcass reinforcement with slight tension and to have greater tension at end A' deposited on the support elements 6 of greater diameter.

To carry out this operation of expansion of the drum 1 in intermediate position, one proceeds as follows:
- The expansion chambers 17 are inflated. This results in a displacement of segments 41, 42 and 43 radially and, at the same time, the displacement of pawls 63 (73) guided in the holes 361 (371) in cams 561 (571) to the limiting position shown in FIG. 5B. Locking of the pawls 63 (73) stops the movement of the segments of the body 10 and, consequently, defines the intermediate position.

By supplying fluid to jack 70 (71) through holes 721 and 723 to move the jack 70 (71) to the intermediate position, the crowns 56 and 57 are turned to their position represented in FIG. 5C. The air supply of the expansion chambers 17 can then be stopped, the drum 1 nevertheless remains in the intermediate position and the pawls 63 (73) re-descend into holes 361 (362), as shown in FIG. 5D. This movement remains within the limit of the traditional plays between mechanical parts.

Figure 6D:
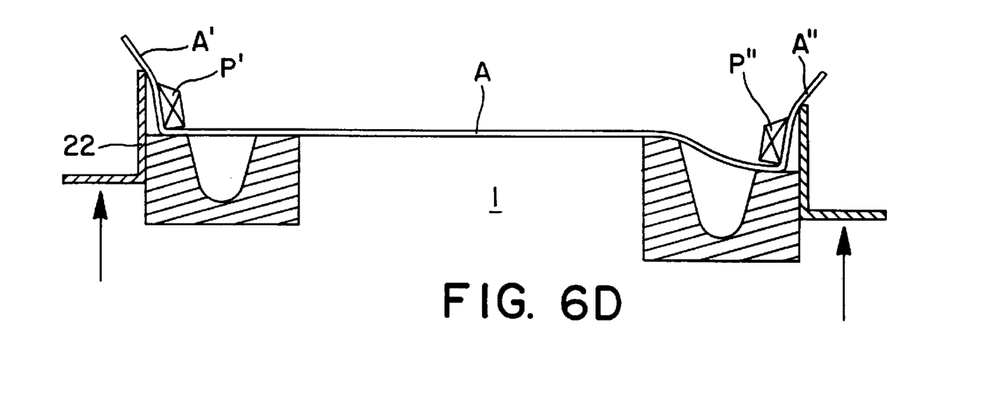

The drum 1 remaining in intermediate position, the lifting fingers 22 are deployed under the action of jacks 23. The profiles P' and P" are thus raised and turn around their points R' and R" and ends A' and A" of the carcass reinforcement A are also raised. Not resting on any surface, they remain free, as shown in FIG. 6D.

Figure 6E:
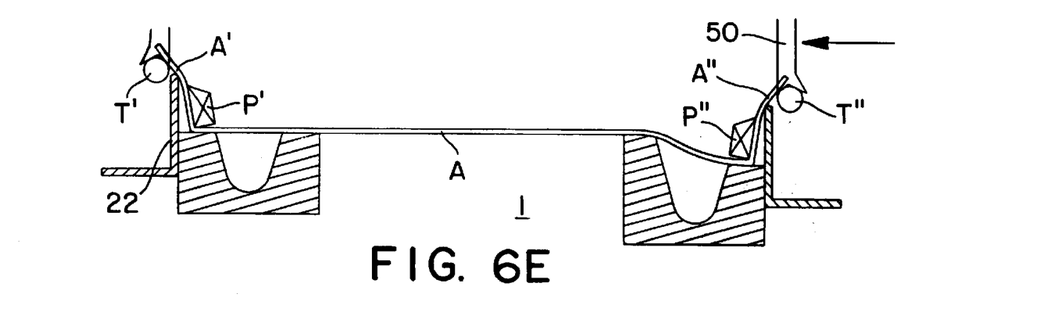

The guide wires 50 carrying the bead wires T' and T" are then axially advanced toward the carcass reinforcement A until the free ends of said reinforcement come in contact on the bead wires T' and T" respectively, as represented in FIG. 6E. A "braided" bead wire is employed in this example, that is, a bead wire formed by a core around which one or more of the strands or cords are wound in one or more layers turning around the core.

Figure 6F:
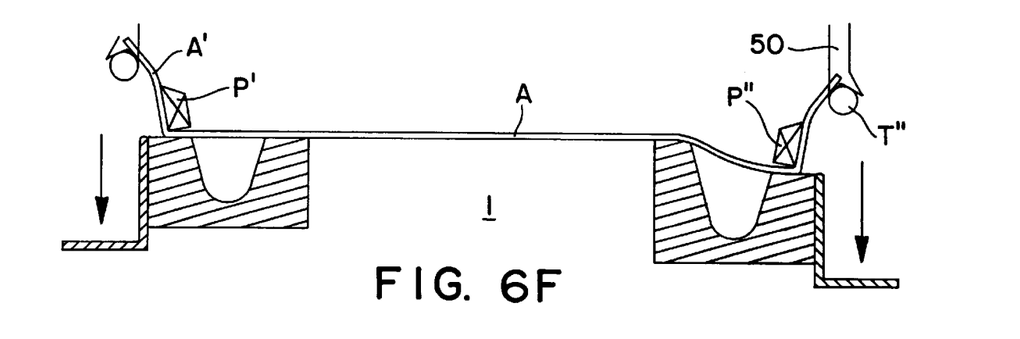

According to FIG. 6F, the drive jacks 23 then stop feeding and the lifting fingers 22 are returned to rest position by the return belt 27, ends A' and A" of the carcass reinforcement A then bearing solely on bead wires T' and T".

Figure 6G:
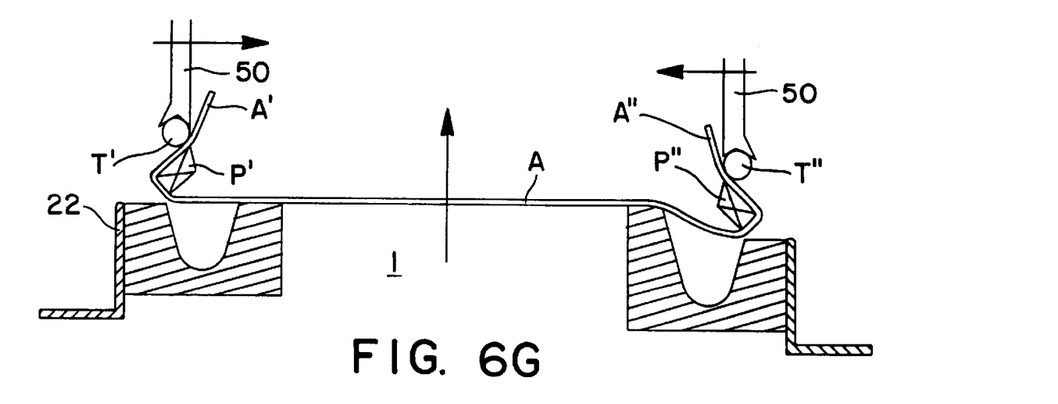

The advance of the guide wires 50 is then synchronized with the expansion of the drum 1 to the expanded position, bead wires T' and T" carrying along with them the ends A' and A" of the carcass reinforcement A and making the turn-ups around the profiles P' and P", as represented on FIG. 6G.

Figure 6H:
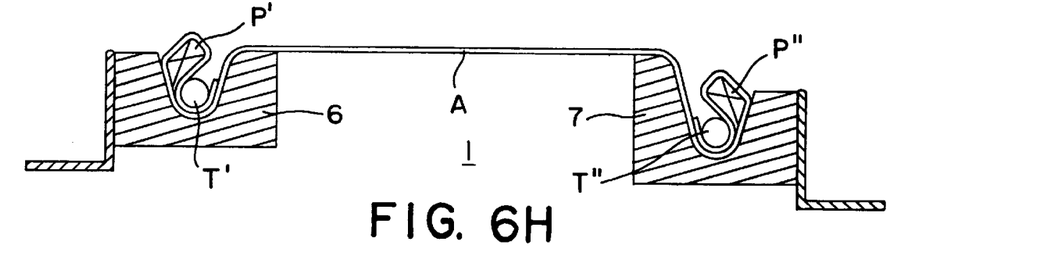

Once the bead wires T' and T" are in the axial position corresponding to the final position desired, the wires are relaxed and expansion of the drum to its expanded position is ended, so as to fix the position of the bead wires axially and radially, bead wire T' (T") and profile P' (P") then being received in the receiving groove 18 (19), as clearly shown in FIG. 6H.

This second inflation of the drum 1 is obtained by the jacks 70 and 71 driving the crowns 56 and 57, which turns them as far as the outlet position of said jacks represented in FIG. 5E. The expansion chambers 17 are then supplied and can be re-deployed, since the pawls 63 (73) have a new freedom of radial displacement until reaching the position represented in FIG. 5F, which corresponds to the expanded position of the drum 1. It is clear that it will be sufficient to relax the pressure of the expansion chambers 17 and to supply the jack 70 (71) through hole 721 to bring the crowns 56 and 57 back to their angular position represented in FIG. 5A in order to deflate the drum.

Without departing from the scope of the invention, it is entirely possible to envisage elements other than the expansion chambers in order to carry out radial expansion of the drum, the control crowns with the system of subjection of the radial position of the drum to the circumferential positions of the crowns not being linked to the choice of expansion chambers.

The other component products of the tire are then placed. The invention does not concern this part of the manufacture of the tire. Numerous methods are available to the expert, which is why it is unnecessary to take up this aspect of production within the context of the present invention. It is noted, however, that in the case of a two-stage manufacturing process, it is necessary to provide for take up flanges of different diameters on the so-called "finishing" drum.

Vulcanization of the tire is then undertaken, for which the tire is sent to the press with the smallest diameter at the top and, in order to take this asymmetry into account, a press is used with an upper bed containing a bearing crown for molding the upper bead, a similar retractable device equipping the lower bed. It is to be noted, furthermore, that the tire is placed in the press and removed from the mold without difficulty due to the asymmetry.

We claim:

1. A radially expansible assembly drum for the manufacture of tires, comprising a body mounted on a center shaft and presenting a receiving surface for tire components to be assembled, the ends of said receiving surface having different diameters, retractable means capable of covering the end of the receiving surface of smaller diameter, and means for expansion of the drum, including the receiving surface and the ends thereof, to two different predetermined and stable expanded positions after the retractable means is retracted to uncover the end of the receiving surface of smaller diameter.

2. A drum according to claim 1, in which the retractable means comprise a collar mounted for movement relative to the center shaft between a retracted position and a position covering the end of the receiving surface of smaller diameter.

3. A drum according to claim 1, in which the expansion means comprise at least one control crown concentric to the center shaft and rotatably mounted on the center shaft axially outside the body of the drum in proximity to one end of the latter, and in which the expanded position of the drum is controlled by the angular position of said crown.

4. A drum according to claim 3, in which the end of the body carries at least one pawl controlled by a cam carried by the control crown.

5. A drum according to claim 4, in which the cam is a guide slot which cooperates with the pawl and the crown is rotably mounted on a ring concentric to the center shaft.

6. A drum according to claim 3, in which the retractable means comprise a collar mounted for movement relative to the center shaft, between a retracted position and a position covering the end of the receiving surface of smaller diameter, and in which the control crown bears guiding elements of the collar.

7. A drum according to claim 3, in which the body comprises a plurality of segments juxtaposed circumferentially around the center shaft, the control crown carries a cam and each segment has a pawl controlled by a cam of the control crown.

* * * * *

UNITED STATES PATENT AND TRADEMARK OFFICE
CERTIFICATE OF CORRECTION

PATENT NO. : 6,250,356 B1
DATED : June 26, 2001
INVENTOR(S) : Cordaillat et al.

It is certified that error appears in the above-identified patent and that said Letters Patent is hereby corrected as shown below:

<u>Title page,</u>
Item [73], Assignee, "Clermont-Ferrend" should read -- Clermont-Ferrand --

<u>Column 6,</u>
Line 6, "comprises," should read -- comprises --

<u>Column 8,</u>
Line 45, "rotably" should read -- rotatably --

Signed and Sealed this

Twenty-sixth Day of November, 2002

Attest:

Attesting Officer

JAMES E. ROGAN
Director of the United States Patent and Trademark Office